No. 776,473. PATENTED NOV. 29, 1904.
O. J. JOHNSON.
CAN SOLDERING MACHINE.
APPLICATION FILED JULY 17, 1903.
NO MODEL. 2 SHEETS—SHEET 2.
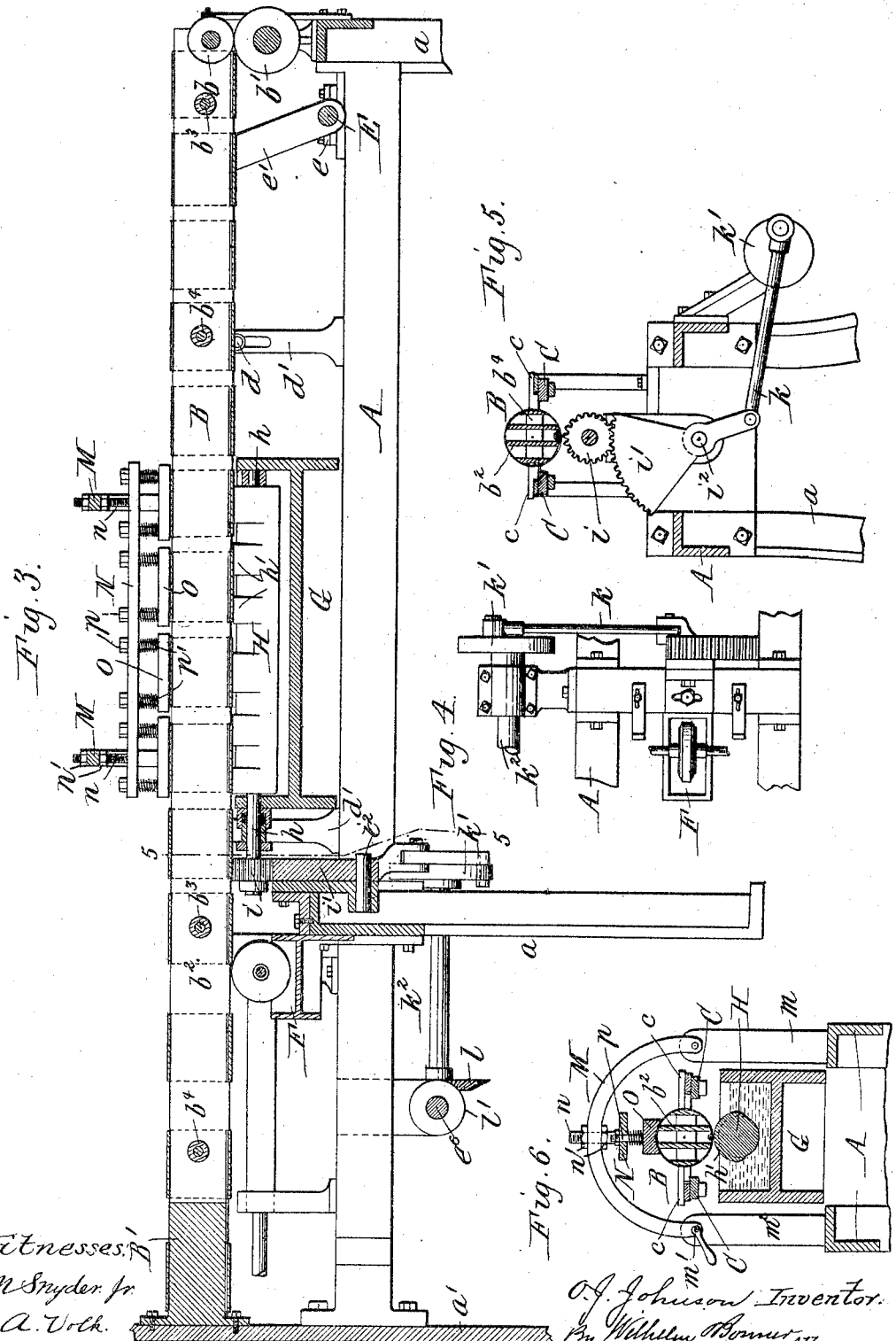
Witnesses:
J. N. Snyder, Jr.
E. A. Volk.
O. J. Johnson, Inventor.
By Wilhelm Bonner, Attorneys No. 776,473.  Patented November 29, 1904.

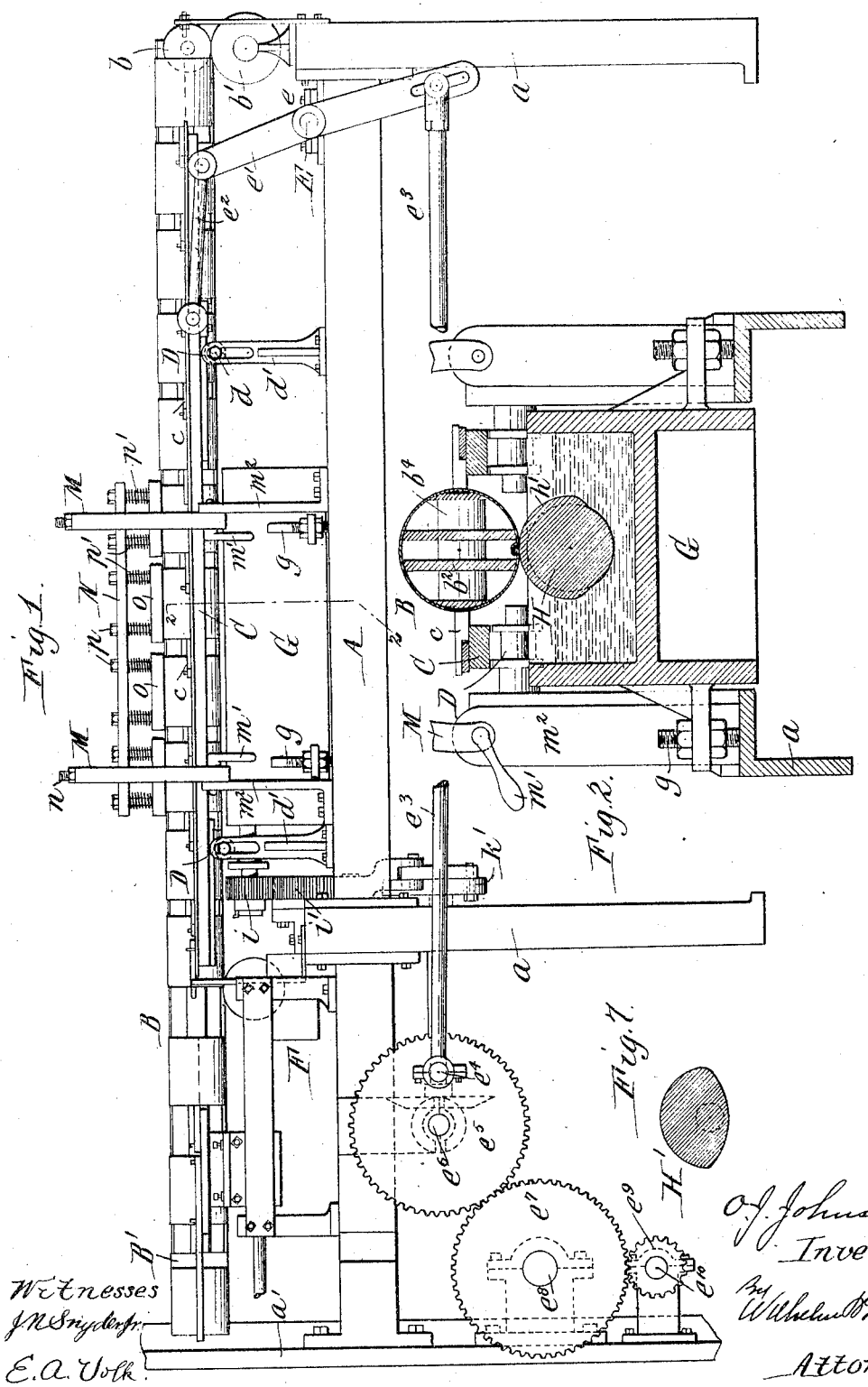

UNITED STATES PATENT OFFICE.

OLIVER J. JOHNSON, OF WHEELING, WEST VIRGINIA.

CAN-SOLDERING MACHINE.

SPECIFICATION forming part of Letters Patent No. 776,473, dated November 29, 1904.

Application filed July 17, 1903. Serial No. 166,003. (No model.)

*To all whom it may concern:*

Be it known that I, OLIVER J. JOHNSON, a citizen of the United States, residing at Wheeling, in the county of Ohio and State of West Virginia, have invented new and useful Improvements in Can-Soldering Machines, of which the following is a specification.

This invention relates to a machine for soldering the longitudinal or side seams of can-bodies, and more especially to a side-seam-soldering machine comprising a soldering-horn on which the can-bodies are supported and moved along intermittently with their seam sides lowermost over a bath of molten solder in which a soldering roller or device is partially submerged and is moved or oscillated to carry a portion thereof transversely across the seams to apply the solder thereto while the can-bodies are stationary—that is, between the movements of the can-bodies along the horn.

The object of the invention is to provide an efficient soldering-machine of this character which is of simple and desirable construction and which thoroughly applies and sweats the solder into the seams and prevents any solder from entering the can-bodies.

In the accompanying drawings, consisting of two sheets, Figure 1 is a side elevation of a can-soldering machine embodying the invention. Fig. 2 is a fragmentary transverse section thereof, on an enlarged scale, in line 2 2, Fig. 1. Fig. 3 is a longitudinal vertical sectional elevation thereof. Fig. 4 is a fragmentary plan view showing the oscillating mechanism for the solder-applying device. Fig. 5 is a transverse section in line 5 5, Fig. 3, looking toward the rear of the machine. Fig. 6 is a fragmentary transverse section showing the devices for holding the can-bodies from turning. Fig. 7 is a cross-section of a solder-applying device of modified form.

Like letters of reference refer to like parts in the several figures.

In the accompanying drawings a soldering-machine is shown which is designed so that it can be connected with and form part of a can-body-forming machine of the character disclosed in my application for United States Letters Patent filed November 28, 1902, Serial No. 133,031. The soldering-machine is not, however, limited to use in connection with any particular type of body-forming machine, but can be used in connection with various types of can-body-forming machines or separately or independently of any forming-machine.

The main supporting-frame of the several operative parts of the machine may be of any suitable construction, that shown consisting of longitudinal horizontal rails A, which are supported by vertical transverse standards or legs $a$ and by a frame or standard $a'$, which constitutes a part of the main frame of the can-body-forming machine to which the soldering-machine is applied.

B represents the soldering-horn, on which the can-bodies are supported and along which they are conveyed over the solder-applying device. The horn shown is connected at its rear end to the front end of a part B', secured to the frame $a'$, and which constitutes the forming horn or mandrel of the can-body-forming machine, and is supported at its front end preferably by a roller $b$, which is journaled in the end of the soldering-horn, and rests upon a second roller $b'$, journaled in suitable bearings at the front end of the main frame of the soldering-machine. The soldering-horn may be of any suitable construction, but preferably consists of four separated longitudinal bars $b^2$, which are arranged on edge and are connected by suitable transverse bolts $b^3$, the bars being held in their proper spaced relation by spacing-sleeves or the like $b^4$.

The can-bodies are moved intermittently along the soldering-horn over the soldering device by any suitable conveyer. For this purpose the machine shown in the drawings is provided with two horizontal reciprocating feed-bars C, arranged at opposite sides of the soldering-horn and supported somewhat below the center line of the latter on grooved rollers D, journaled on horizontal studs $d$, secured to upright brackets $d'$, rising from the horizontal rails of the main frame. The feed-bars carry sets of dogs $c$, which at each forward movement of the feed-bars engage and move the can-bodies one step and pass the can-bodies in the rearward movements of the feed-bars, leaving the can-bodies stationary on the horn.

E represents a horizontal rock-shaft journaled transversely of the frame in suitable bearings $e$ at the front end of the frame. The shaft is provided at its opposite ends with upwardly-extending rock-arms $e'$, which are connected at their upper ends to the adjacent ends of the reciprocating feed-bars by links or rods $e^2$. The rock-shaft is also provided at one end with a depending rock-arm, which is adjustably secured to the front end of a pitman $e^3$, connected at its rear end to a wrist-pin $e^4$ on a gear-wheel $e^5$, secured to a horizontal transversely-arranged shaft $e^6$, journaled in suitable bearings depending from the horizontal rails of the main frame. The shaft $e^6$ may constitute the drive-shaft for the soldering-machine, but is shown as driven by an idler gear-wheel $e^7$, journaled on a shaft $e^8$ and driven in turn by a pinion $e^9$, secured to a shaft $e^{10}$, which is one of the shafts of the body-forming machine. Any other suitable means for supporting and reciprocating the feed-bars may be employed.

F represents an aciding device, consisting of an acid pot or receptacle supported beneath the rear end portion of the soldering-horn, and a wheel of suitable material which is mounted to rotate so as to dip into the acid or flux in the pot and apply the same to the seams of the can-bodies as the latter are moved along the horn with their seams lowermost. Any other means for this purpose may be employed.

G represents the solder box or receptacle, which is arranged beneath the soldering-horn in front of the aciding device and contains a bath of molten solder, which is maintained in a molten condition by any suitable heating means. The solder-box shown is rectangular in form and is supported on the horizontal rails of the main frame by adjusting-screws $g$, by which the solder-box can be adjusted vertically into the proper position relative to the soldering-horn.

H represents a soldering device which is arranged beneath the horn in the solder-box parallel with or longitudinally relative to the horn. The soldering device is journaled in any suitable manner to oscillate about its axis, so that its surface moves crosswise or transversely past the seams of the can-bodies on the horn. As shown, the soldering device is provided at opposite ends with journals $h$, seated in bearings formed on or secured to the ends of the solder-box. The soldering device is provided with raised segmental circumferential portions $h'$, which extend part way, preferably somewhat more than half-way, around the device, and which when the device is oscillated sweep across the seam or seams of the can body or bodies on the horn, carrying solder up with them from the bath and applying the same to the seam or seams.

The oscillations of the soldering device are so timed with respect to the movements of the can-bodies longitudinally along the horn that the raised portions $h'$ of the device move past and apply solder to the seams only when the can-bodies are at rest, and the bodies are moved on the horn only when the depressed portions of the soldering device or the surface portions thereof between the ends of the raised segmental portions are opposite to the seams. As the depressed portions of the soldering device do not extend up high enough to carry solder to the seams, the can-bodies cannot scoop or take up any solder from the soldering device as they are moved along on the horn, and thus solder is effectually prevented from entering the can-bodies, so that there is little waste of solder, and the insides of the cans are kept free therefrom. The soldering device shown has a plurality of separated raised segmental portions $h'$, which are so located and spaced that the first two segmental portions apply solder to the end portions only of the seam, after which the can is moved and the next segmental face applies solder to the unsoldered central portion of the seam. Sufficient segmental raised portions are provided to completely solder each seam two or more times. It will be understood, however, that instead of the separated segmental portions a single unbroken segmental raised portion of any desired length may be employed. Also instead of the soldering device being circular with raised segmental portions, as described, it could be segmental in cross-section, as shown at H' in Fig. 7.

Any suitable means may be employed for oscillating the soldering device to effect the soldering of the seams in the manner above described. In the construction shown (see Figs. 3, 4, and 5) the journal at the rear end of the soldering device projects through a stuffing-box on the end of the solder-box and is provided at its outer end with a gear-pinion $i$, with which meshes a gear-segment $i'$, mounted to oscillate upon a stud or shaft $i^2$, secured to a suitable part of the main frame. The gear-segment is provided with an arm connected by a pitman or rod $k$ to the wrist-pin on a crank-disk $k'$, secured to a horizontal longitudinally-arranged shaft $k^2$, journaled in suitable bearings at one side of the main frame and provided with a bevel gear-wheel $l$, which meshes with and is driven by a bevel gear-pinion $l'$, secured to the operating crank-shaft $e^6$ for the reciprocating feed-bars.

The mechanism just described for operating the soldering device is preferably so proportioned that the soldering device is turned a complete revolution in one direction and then a complete revolution in the opposite direction. A rotating roller having segmental raised portions or a device of segmental shape in cross-section used in connection with the intermittent can-body conveyer would prevent the solder from entering the can-bodies; but the oscillating device is deemed preferable.

The following device is preferably employed for pressing the can-bodies down upon the soldering device and holding the same from turning on the supporting-horn when the raised segmental faces of the soldering device sweep across the can-body seams. M represents transverse arched frame-bars which extend over the soldering-horn, each being pivoted at one end to a suitable upright support $m$, rising from the horizontal rail A at one side of the main frame. The other ends of the arched frame-bars are detachably connected by removable bolts or pins $m'$ to the upper ends of upright supports $m^2$, rising from the horizontal rail at the other side of the main frame. N represents a connecting-bar arranged longitudinally above the soldering-horn and connected at its ends to the arched frame-bars by vertical screws $n$, which pass through holes in the arch-bars and are securely held and adjusted vertically by nuts $n'$, screwed on the screws $n$ on opposite sides of the arched frame-bars. O represents presser-blocks which are carried by the connecting-bar N and arranged one over each of the can-bodies on the horn when the bodies are stationary. The under faces of the presser-blocks are preferably concaved to conform to the cylindrical can-bodies. Each of the presser-blocks is provided with upright stems $p$, which pass loosely through holes in the connecting-bar N and is pressed downwardly against the can-body by coil-springs $p'$, surrounding said upright stems between the presser-block and the connecting-bar. The stems of the presser-blocks are preferably provided with heads or enlargements above the connecting-bar to prevent the detachment of the presser-blocks. Each presser-block is pressed independently against its can-body, so that each can-body is held firmly regardless of any sagging or inequalities in the soldering-horn. When it is desired to remove the soldering-horn from the machine, bolts $m'$ are removed and the supporting-frame for the presser-blocks is swung over to one side on its pivots, thus carrying the presser-blocks from above the horn, where they will not interfere with the removal of the latter.

I claim as my invention—

1. In a can-soldering machine, the combination of a support for the can-body, a bath of molten solder arranged beneath said support, a soldering device, means for moving said soldering device to carry a portion thereof transversely across the seam of the can-body to apply solder thereto while the can-body is at rest, and means for moving the can-body while said portion of the soldering device is out of contact with the seam, substantially as set forth.

2. In a can-soldering machine, the combination of a support for the can-body, a bath of molten solder arranged beneath said support, a soldering device provided with a raised solder-applying portion, means for moving said raised portion transversely across the seam of the can-body while the latter is at rest, and means for moving the can-body while said raised solder-applying portion is out of contact with the seam, substantially as set forth.

3. In a can-soldering machine, the combination of a support for the can-body, a bath of molten solder arranged beneath said support, a soldering device partially submerged in said solder-bath and provided with a segmental raised solder-applying portion, means for moving said soldering device to carry said raised portion transversely across the seam of the can-body to apply solder thereto, and means for intermittently moving the can-body whereby the latter is stationary while said raised portion of the soldering device is in contact with the seam and is moved while said raised portion is out of contact with the seam, substantially as set forth.

4. In a can-soldering machine, the combination of a support for the can-body, a bath of molten solder arranged beneath said support, an oscillating soldering device partially submerged in said solder-bath, means for oscillating said soldering device to carry a portion thereof transversely across the seam of the can-body, and means for intermittently moving the can-body whereby the latter is stationary while the soldering device is in contact with the seam and is moved while the soldering device is out of contact with the seam, substantially as set forth.

5. In a can-soldering machine, the combination of a support for the can-body, a bath of molten solder arranged beneath said support, an oscillating soldering device partially submerged in said solder-bath and provided with a segmental raised soldering portion, and means for oscillating said device to carry said segmental soldering portion transversely across the seam of the can-body to apply solder thereto, substantially as set forth.

6. In a can-soldering machine, the combination of a support for the can-body, a bath of molten solder arranged beneath said support, an oscillating soldering device partially submerged in said solder-bath and provided with a segmental raised soldering portion, means for oscillating said device to carry said segmental soldering portion transversely across the seam of the can-body to apply solder thereto, and means for intermittently moving the can-body whereby the latter is stationary while the soldering device is in contact with the seam and is moved while the soldering device is out of contact with the seam, substantially as set forth.

7. In a can-soldering machine, the combination of a support for the can-body, a bath of molten solder arranged beneath said support, an oscillating soldering device partially submerged in said solder-bath and provided with separated raised segmental soldering portions, means for oscillating said soldering device to carry said segmental soldering portions transversely across the seam of the can-body to apply the solder thereto, and means for intermittently moving the can-body whereby the can-body is stationary while said raised soldering portions are in contact with the seam and is moved while said raised soldering portions are out of contact with the seam, substantially as set forth.

8. In a can-soldering machine, the combination of a support for a can-body, a bath of molten solder arranged beneath said support, a soldering device partially submerged in said solder-bath and provided with a raised segmental portion, means for oscillating said soldering device to carry said segmental soldering portion across the seam to apply the solder thereto, and means for preventing the can-body from turning on said support, substantially as set forth.

9. In a can-soldering machine, the combination of a support for the can-body, a bath of molten solder, a soldering device movable to carry a portion thereof transversely across the seam of the can-body to apply solder thereto while the can-body is at rest, means for moving the can-body while said portion of the soldering device is out of contact with the seam, and means arranged exteriorly of the can-body for holding the latter from turning on the support, substantially as set forth.

10. In a can-soldering machine the combination of a support for the can-body, a soldering device movable transversely relative to the longitudinal side seam of the can-body to apply solder to the seam, a presser arranged externally of the can-body for holding the latter from turning on said support, means for yieldingly holding said presser against the can-body on said support, and a movable support for said presser device whereby the same can be moved away from the can-support, substantially as set forth.

11. In a can-soldering machine, the combination of a support for the can-body, a soldering device movable to apply solder to the seam of the can-body, a pivoted frame arranged above said support, and a series of independently-movable presser-blocks carried by said frame for holding said can-bodies from turning on said support, substantially as set forth.

Witness my hand this 29th day of June, 1903.

OLIVER J. JOHNSON.

Witnesses:
    DAVID MACKIE,
    W. F. BERNHEISEL.